(12) United States Patent  
Conway

(10) Patent No.: US 7,597,296 B2  
(45) Date of Patent: Oct. 6, 2009

(54) CLIP FOR A DISPLAY

(76) Inventor: James F. Conway, 3943 W. Pine Blvd., St. Louis, MO (US) 63108

( * ) Notice: Subject to any disclaimer, the term of this patent is extended or adjusted under 35 U.S.C. 154(b) by 312 days.

(21) Appl. No.: 10/802,640

(22) Filed: Mar. 16, 2004

(65) Prior Publication Data

US 2006/0186291 A1    Aug. 24, 2006

(51) Int. Cl.
*A47B 96/06* (2006.01)
*E04C 5/16* (2006.01)

(52) U.S. Cl. .................. 248/229.16; 52/678; 52/686; 52/719; 248/316.7

(58) Field of Classification Search .............. 248/231.8, 248/230.1, 230.7, 231.81, 316.7, 229.16, 248/229.26, 316.8; 52/677, 678, 684, 685, 52/686, 719
See application file for complete search history.

(56) References Cited

U.S. PATENT DOCUMENTS

| | | | | | |
|---|---|---|---|---|---|
| 3,747,166 | A | * | 7/1973 | Eross | ............. 248/75 |
| 4,100,652 | A | * | 7/1978 | Carlson | ............. 24/3.1 |
| 4,121,798 | A | * | 10/1978 | Schumacher et al. | ......... 248/113 |
| 4,610,122 | A | * | 9/1986 | De Clercq | ............. 52/719 |
| 5,159,730 | A | | 11/1992 | Radvin | ............. 24/543 |
| 5,332,090 | A | * | 7/1994 | Tucker | ............. 206/315.3 |
| 5,371,991 | A | * | 12/1994 | Bechtel et al. | ............. 52/686 |
| 5,546,641 | A | | 8/1996 | Radvin et al. | ............. 24/557 |
| D375,453 | S | * | 11/1996 | Fleck | ............. D8/395 |
| 5,697,591 | A | * | 12/1997 | Cooper | ............. 248/229.16 |
| 6,161,360 | A | * | 12/2000 | Smith | ............. 52/678 |

* cited by examiner

*Primary Examiner*—Amy J. Sterling
*Assistant Examiner*—Tan Le
(74) *Attorney, Agent, or Firm*—Polster, Lieder, Woodruff & Lucchesi, L.C.

(57) ABSTRACT

A clip of the present invention comprises a unitary body having an intermediate section and a first pair of opposing arms with each of the arms having an end portion, the body having an interior surface and an exterior surface, a second pair of opposing arms formed on the exterior surface of the body, each of the second pair of opposing arms having an end portion with the second pair of opposing arms being located between one of the first pair of opposing arms and the intermediate section.

7 Claims, 2 Drawing Sheets

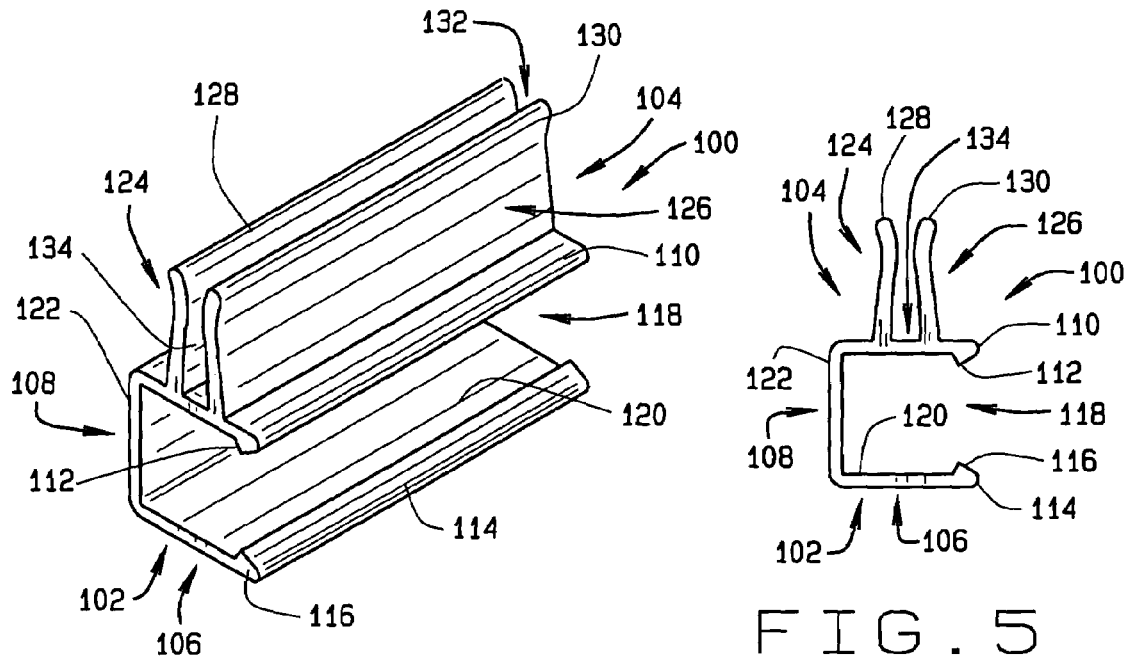
FIG. 4
FIG. 5
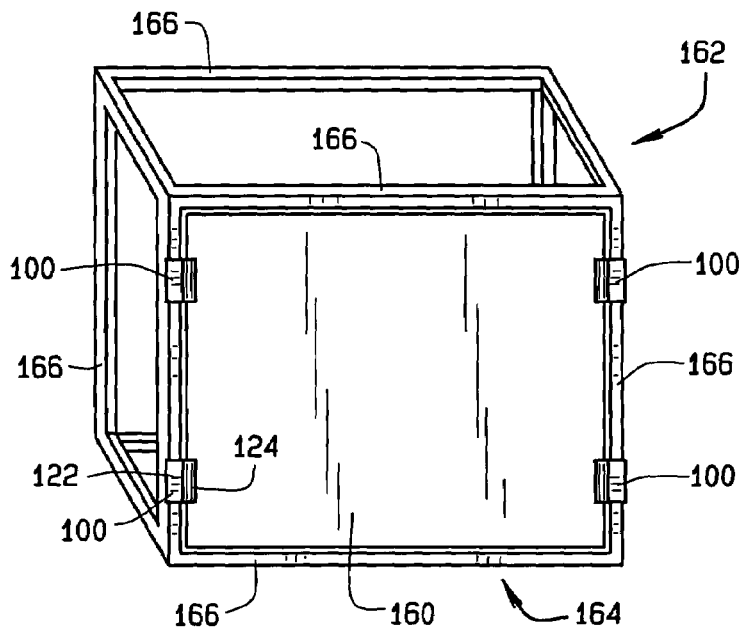
FIG. 6

CLIP FOR A DISPLAY

BACKGROUND OF THE INVENTION

This invention relates to a clip device, and more particularly, to a clip used in a display device such as a display tower.

Displays or display towers are used in commercial or retail establishments to display merchandise or advertisements for merchandise. Displays are also used for exhibits, booths, and trade shows. Typically these display towers are formed from rods or poles and are assembled to hold cutouts, sheets, or panels formed from foam board. However, foam board is difficult to work with, needs to be replaced, and is difficult to easily secure to the display tower. In particular, if the foam board has an advertisement printed on it and if the ad changes or a new advertisement is needed then new foam board must be used. This requires that the old foam board be removed from the display tower and new foam boards be printed and inserted into the display tower. Further, the manner in which foam board is held in place is cumbersome. Therefore, there is a need to provide a device that is used to assemble a display tower using other type panels than foam board. It would also be advantageous to have a means or method for securing other types of panels to a display device.

The present invention is designed to obviate and overcome many of the disadvantages and shortcomings associated with presently available methods and constructions of fixing or securing cutouts, sheets, displays, or panels to a display tower. In particular, the present invention is a clip that is designed and constructed to secure or attach a panel to a display tower with the clip also being capable of being easily disassembled or removed from both the panel and the display tower. Moreover, the clip of the present invention may be easily positioned along the panel and the display tower for proper alignment of the panel within or on the display tower.

SUMMARY OF THE INVENTION

In one form of the present invention, a clip comprises a unitary body having an intermediate section and a first pair of opposing arms with each of the arms having an end portion, the body having an interior surface and an exterior surface, a second pair of opposing arms formed on the exterior surface of the body, each of the second pair of opposing arms having an end portion with the second pair of opposing arms being located between one of the first pair of opposing arms and the intermediate section.

In another form of the present invention, a clip comprises a unitary body having an intermediate section and a first pair of opposing arms with each of the arms having an end portion having a nib, the body having an interior surface and an exterior surface, a second pair of opposing arms formed on the exterior surface of the body, each of the second pair of opposing arms having an end portion with the second pair of opposing arms being located between one of the first pair of opposing arms and the intermediate section.

In yet another form of the present invention, a clip is disclosed that comprises a unitary body having an intermediate section and a first pair of opposing arms with each of the arms having an end portion, the body having an interior surface and an exterior surface, a second pair of opposing arms formed on the exterior surface of the body, each of the second pair of opposing arms having an end portion with the second pair of opposing arms being located offset from one of the first pair of opposing arms.

In light of the foregoing comments, it will be recognized that a principal object of the present invention is to provide a clip used for assembling a display.

A further object of the present invention is to provide a clip which is of simple construction and design, is inexpensive, and which can be easily employed with highly reliable results.

Another object of the present invention is to provide a clip that is easy to use and may be moved or positioned along a panel and a display device.

A still further object of the present invention is to provide a clip that can be secured to and released from a post, a rod, or a pole.

A further object of the present invention is to provide a clip that may be used to prepare and construct a display.

Another object of the present invention is to provide a clip that is strong and flexible and has unitary construction.

Another object of the present invention is to provide a clip that may be easily manufactured and may be disposable.

These and other objects and advantages of the present invention will become apparent after considering the following detailed specification in conjunction with the accompanying drawings, wherein:

BRIEF DESCRIPTION OF THE DRAWINGS

FIG. 4 is a perspective view of another preferred embodiment of a clip constructed according to the present invention;

FIG. 5 is a side view of the clip shown in FIG. 4; and

FIG. 6 is a perspective view of the clip shown in FIG. 4 mounted to a display device and a display.

DETAILED DESCRIPTION OF THE PREFERRED EMBODIMENTS

Figure 1:
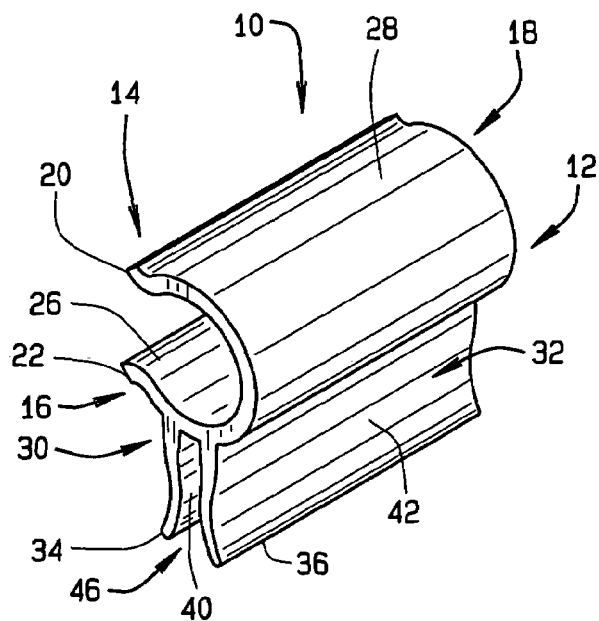
FIG. 1 is a perspective view of a preferred embodiment of a clip constructed according to the present invention.
Figure 2:
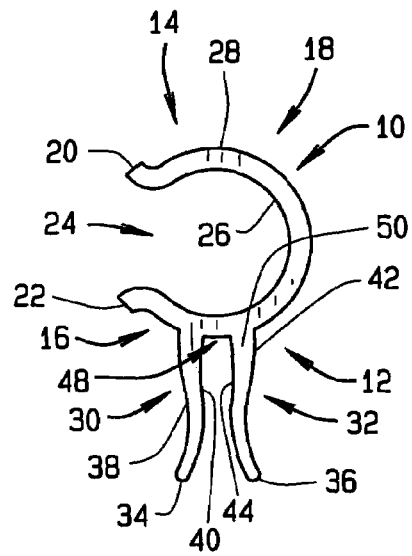
FIG. 2 is a side view of the clip shown in FIG. 1.

Referring now to the drawings, wherein like numbers refer to like items, number 10 identifies a preferred embodiment of a clip constructed according to the present invention. With reference now to FIGS. 1 and 2, the clip 10 comprises a unitary body 12 having a first pair of opposing arms 14 and 16 and an intermediate section 18. The intermediate section 18 is arcuate or rounded in shape. The arms 14 and 16 and the intermediate section 18 form a generally C-shaped cross-section. The arms 14 and 16 have opposing end portions 20 and 22, respectively. The end portions 20 and 22 are spaced apart from each other to form a mouth or an opening 24 to allow a rod or pipe (not shown) to pass there through as will be discussed more fully herein. The end portions 20 and 22 are flared outwardly from the respective opposing arms 14 and 16. The clip 10 has an interior surface 26 and an exterior surface 28. The interior surface 26 is adapted to engage or surround a rod or pipe for holding the clip 10 to a rod or pipe for display purposes as will be shown more fully hereinafter.

The clip 10 has a second pair of opposing arms 30 and 32 positioned on the exterior surface 28. The arms 30 and 32 are positioned closer to the arm 16 and are offset from the arm 14. The arms 30 and 32 have opposing end portions 34 and 36, respectively, that are spaced apart from each other. The end portions 34 and 36 are slanted or flared away from each other. The arms 30 and 32 are spaced apart from each other to allow a sign or display to be captured within or between the arms 30 and 32. The arms 30 and 32 may be sized and shaped to receive a particular thickness of a panel, sign, or a display. The end portions 34 and 36 facilitate directing and positioning a sign or display within the arms 30 and 32. The arm 30 has an exterior surface 38 and an interior surface 40. Further, the arm 32 has an exterior surface 42 and an interior surface 44. The interior surfaces 40 and 44 are used to hold or grasp a sign or a display. The exterior surfaces 38 and 42 serve as finger grips to assist in positioning the arms 30 and 32 on a sign or a display. The arms 30 and 32 form a mouth or an opening 46 at the ends 34 and 36. Further, the arms 30 and 32 define an area 48 where the arms 30 and 32 are positioned on the exterior surface 28 of the arm 16 of the clip 10. The opening 46 is narrower at the ends 34 and 36 than at the area 48. Further, the shape of the arm 30 may be more planar than the shape of the other arm 32. The arm 32 may have a slight curved portion 50 to it as compared to the arm 30. This curve portion 48 helps in making adjustments when a panel is inserted between the arms 30 and 32. As can be appreciated, the arms 30 and 32 may have various dimensions and lengths. For example, the arms 30 and 32 may have a length of ⅜ inches or ½ inches.

The clip 10 may be molded or extruded from any suitable plastic material such as PVC. The clip 10 is flexible enough to allow the clip 10 to snap onto a rod or a pipe by use of the arms 14 and 16 while at the same time snap onto or grip a sign or display by use of the arms 30 and 32. The clip 10 may be formed of a clear material or a material that has color. The clip 10 may also be constructed of a material that is frosted. Various combinations of clear material, colored material, and frosted material are also possible in a single clip 10.

Figure 3:
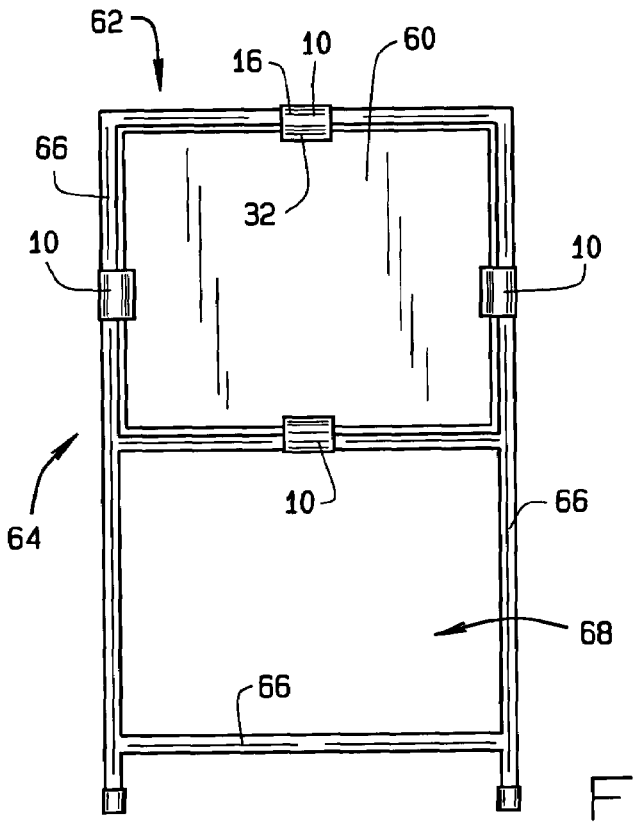
FIG. 3 is a perspective view of the clip shown in FIG. 1 mounted to a display device and a display.

FIG. 3 depicts four of the clips 10 being used to hold a panel 60 on a display tower 62 to form a display 64. The display tower 62 is constructed of rods 66 with the clips 10 being capable of snap fit engagement with the rods 66. In particular, the interior surface 26 of the clip 10 is capable of engaging the surface of the rod 66 to hold or secure the clip 10 onto the rod 66. The arms 14 and 16 and the intermediate section 18 are sized and shaped to fit onto the rod 66. The arms 30 and 32 are used to capture or hold the panel 60. In constructing the display 64, the clip 10 is first inserted onto the panel 60 and then the clip 10 is inserted onto the rods 66 of the display tower 62. The clips 10 may be positioned anywhere along the edges of the panel 60 and the rods 66. Further, the clips 10 may be repositioned along the panel 60 and the rods 66, if required. If required, more than one clip 10 may be inserted onto an edge of the panel 60. The display 64 may also have an area 68 in which there is no panel connected to the rods 66.

Referring now to FIGS. 4 and 5, another preferred embodiment of a clip 100 of the present invention is illustrated. The clip 100 is designed for use on a rectangular shaped rod or post. In particular, the clip 100 comprises a unitary body 102 having a first pair of opposing arms 104 and 106 and an intermediate portion 108. The arms 104 and 106 and the intermediate section 108 form a generally squared C-shaped cross-section. The arm 104 has an end portion 110 that has a nib portion 112. The nib portion 112 is generally triangular in shape but could take on other shapes such as rounded or square. The other opposed arm 106 also has an end portion 114 that has a nib portion 116. The end portions 110 and 114 are spaced apart from each other to form a mouth or an opening 118 to allow a rectangular rod or pipe (not shown) to pass there through. The nib portions 112 and 116 are adapted to secure the clip 100 to a rod or pipe as will be explained. The clip 100 has an interior surface 120 and an exterior surface 122. The interior surface 122 is adapted to engage or surround a rectangular rod or pipe for holding the clip 100 to a rod or pipe.

The arm 104 of the clip 100 has a pair of opposed arms 124 and 126 positioned on the exterior surface 122 of the clip 100. The arms 124 and 126 are offset from the arm 106. The arm 124 has an end portion 128 that is flared outwardly. The arm 126 also has an end portion 130 that is flared outwardly from the arm 126. The arms 124 and 126 are spaced apart from each other to allow a sign or display to be captured within or between the arms 124 and 126. The arms 124 and 126 may be sized and shaped to receive a particular thickness of a panel, sign, or a display. The end portions 128 and 130 facilitate directing and positioning a sign or display within the arms 124 and 126. The arms 124 and 126 form a mouth or an opening 132 at the end portions 128 and 130. Further, the arms 124 and 126 define an area 134 where the arms 124 and 126 are positioned on the arm 104 of the clip 100. The opening 132 is narrower at the ends 128 and 130 than at the area 134. The arms 124 and 126 may have various dimensions and lengths. For example, the arms 124 and 126 may have a length of ⅜ inches or ½ inches.

With particular reference now to FIG. 6, there is shown four of the clips 100 being used to hold a panel 160 on a display tower 162 to form a display 164. The display tower 162 is constructed of rectangular shaped rods 166 with the clips 100 being capable of snap fit engagement with the rods 166. The arms 104 and 106 and the intermediate portion 108 have a generally rectangular C-shaped configuration that mates with the rectangular shaped rods 166. The nib portions 112 and 116 are capable of attaching to the rods 166 to hold the clip 100 in place. The arms 124 and 126 are used to capture or hold the panel 160. In constructing the display 164, the clip 100 is first inserted onto the panel 160 and then the clip 100 is inserted onto the rods 166 of the display tower 162. The clips 100 may be positioned anywhere along the edges of the panel 160 and the rods 166. Further, the clips 100 may be repositioned along the panel 160 and the rods 166, if required. If required, more than one clip 100 may be inserted onto an edge of the panel 160.

As previously discussed with respect to the clip 10, the clip 100 may be molded or extruded any suitable plastic material such as PVC. The clip 100 is flexible enough to allow the clip 100 to snap onto a rod or a pipe by use of the arms 14 and 16 while at the same time snap onto or grip a sign or display by use of the arms 30 and 32. The clip 10 may be formed of a clear material or a material that has color. The clip 10 may also be constructed of a material that is frosted. Various combinations of clear material, colored material, and frosted material are also possible and contemplated in the construction of a single clip 100.

It should be recognized that the clips 10 and 100 of the present invention could be constructed of various materials. Preferably, the clips 10 and 100 will be of relatively lightweight material so that they can be easily manufactured, assembled, positioned, secured in place, and removed. Further, the clips 10 and 100 will be constructed of relatively inexpensive materials that will provide for the clips 10 and 100 to be disposable or suitable for one time use.

It is also possible and contemplated that an advertisement may be sandwiched between two sheets of material and the clips 10 and 100 be used to hold the advertisement and the sheets of material in place on a display, such as the displays 62 or 162. In this manner a new advertisement may be added by simply removing the old ad from between the two sheets of material. As can be appreciated, a clear or a colored sheet of material may be used in either of the displays 62 or 162. The clips 10 or 100 may be used to hold or secure the clear or colored sheet of material. The clear or colored sheet of material adds a decorative element to either of the displays 62 or 162.

From all that has been said, it will be clear that there has thus been shown and described herein a clip which fulfills the various objects and advantages sought therefor. It will become apparent to those skilled in the art, however, that many changes, modifications, variations, and other uses and applications of the subject clip are possible and contemplated. All changes, modifications, variations, and other uses and applications which do not depart from the spirit and scope of the invention are deemed to be covered by the invention, which is limited only by the claims which follow.

What is claimed is:

1. In a merchandise display formed by a plurality of structural members arranged to attract prospective buyers, the merchandise display including at least one advertising panel associated with it, the display including at least three of the structural members arranged to define an opening, the advertising panel being associated with the opening, the improvement which comprises a clip for use respectively for attaching the panel and for attaching the panel to at least one of the structural members, the clip including a unitary body having an intermediate section and a first pair of opposing arms with each of the arms having an end portion, the body having an interior surface and an exterior surface, the intermediate section and first pair of opposing arms defining an elongated open mouth channel, the channel receiving at least a portion of the display, the portion of the display received by said channel having a first dimensional size for receipt by said channel, a second pair of opposing arms formed on the exterior surface of the body, each of the second pair of opposing arms having an end portion with the second pair of opposing arms being located offset from one of the first pair of opposing arms, the second pair of opposing arms adapted to receive at least a portion of the panel, the portion of the panel received by said second pair of opposed arms having a second dimensional size for receipt by said second pair of opposed arms, the second dimensional size being smaller than the first dimensional size, the panel being generally positioned along the opening defined by the structural members of the display.

2. The improvement of claim 1 wherein the ends of the first pair of opposing arms are flared outwardly.

3. The improvement of claim 1 wherein the ends of the second pair of opposing arms are flared outwardly.

4. The improvement of claim 1 wherein the first pair of opposing arms and the intermediate section form a generally C-shaped cross section.

5. The improvement of claim 1 wherein the clip is comprised of plastic.

6. The improvement of claim 1 wherein the structural members of the display comprise a plurality of rods arranged to define at least one opening intended to hold the advertising panel associated with the display, the panel being positioned along the opening.

7. The improvement of claim 6 wherein the panel is at least partially positioned within the opening.

* * * * *

UNITED STATES PATENT AND TRADEMARK OFFICE
CERTIFICATE OF CORRECTION

PATENT NO.       : 7,597,296 B2                                            Page 1 of 1
APPLICATION NO. : 10/802640
DATED            : October 6, 2009
INVENTOR(S)      : James F. Conway It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 608 days.

Signed and Sealed this

Twenty-eighth Day of September, 2010

David J. Kappos
*Director of the United States Patent and Trademark Office*